(12) United States Patent
Jensen

(10) Patent No.: US 8,733,441 B2
(45) Date of Patent: May 27, 2014

(54) SEALING OF THIEF ZONES

(75) Inventor: Michael Jensen, København NV (DK)

(73) Assignee: Maersk Olie OG Gas A/S, Copenhagen K (DK)

( * ) Notice: Subject to any disclaimer, the term of this patent is extended or adjusted under 35 U.S.C. 154(b) by 495 days.

(21) Appl. No.: 13/129,950

(22) PCT Filed: Nov. 18, 2009

(86) PCT No.: PCT/EP2009/065414
§ 371 (c)(1),
(2), (4) Date: Dec. 1, 2011

(87) PCT Pub. No.: WO2010/057931
PCT Pub. Date: May 27, 2010

(65) Prior Publication Data
US 2012/0061082 A1 Mar. 15, 2012

Related U.S. Application Data

(60) Provisional application No. 61/116,226, filed on Nov. 19, 2008.

(30) Foreign Application Priority Data

Nov. 19, 2008 (DK) .................................. 2008 01618
Nov. 18, 2009 (DK) .................................. 2009 70213

(51) Int. Cl.
*E21B 33/138* (2006.01)
*E21B 43/27* (2006.01)
*C09K 8/46* (2006.01)
*C09K 8/467* (2006.01)

(52) U.S. Cl.
USPC ........... 166/292; 166/281; 166/300; 166/307; 507/277

(58) Field of Classification Search
None
See application file for complete search history.

(56) References Cited

U.S. PATENT DOCUMENTS

| | | | | |
|---|---|---|---|---|
| 2,903,065 A | * | 9/1959 | Bernard et al. | 166/272.6 |
| 3,141,501 A | * | 7/1964 | Bernard et al. | 166/400 |
| 3,219,112 A | | 11/1965 | Sauber et al. | |
| 3,428,129 A | * | 2/1969 | Cook | 166/292 |
| 4,237,974 A | * | 12/1980 | Scherubel | 166/281 |
| 4,809,780 A | | 3/1989 | Shen | |

(Continued)

FOREIGN PATENT DOCUMENTS

| | | |
|---|---|---|
| DE | 198 59 796 A1 | 6/2000 |
| RU | 2 014 444 C1 | 6/1994 |

(Continued)

OTHER PUBLICATIONS

Emmanuel, Simon et al., "Mixing-induced precipitation and porosity evolution in porous media," *Advances in Water Resources* 28 (2005), pp. 337-344.

(Continued)

*Primary Examiner* — George Suchfield
(74) *Attorney, Agent, or Firm* — Brinks Gilson & Lione

(57) ABSTRACT

The present invention provides a method for selectively sealing a thief zone in a hydrocarbon reservoir located in a calcium-rich formation and penetrated by a borehole comprising injecting into the thief zone a sealing fluid comprising a mixture of and hydronium ions ($H^+$) and a source of sulfate ions ($SO_4^{2-}$) which mixture can provide precipitation of a designated calcium sulfate compound.

20 Claims, 10 Drawing Sheets

(56) References Cited

U.S. PATENT DOCUMENTS

| 4,917,185 A | 4/1990 | Jennings, Jr. et al. |
| 6,017,501 A | 1/2000 | Waycuilis |
| 2008/0190614 A1 | 8/2008 | Ballard |

FOREIGN PATENT DOCUMENTS

| RU | 2 265 116 C2 | 12/2004 |
| SU | 775294 A1 | 10/1980 |
| SU | 1208191 A | 1/1986 |
| SU | 1661371 A1 | 7/1991 |
| SU | 1700199 A1 | 12/1991 |
| SU | 1709071 A1 | 1/1992 |
| WO | WO 02/095188 A1 | 11/2002 |
| WO | WO 2007/083144 A1 | 7/2007 |
| WO | WO 2010/057932 A1 | 5/2010 |

OTHER PUBLICATIONS

Rege, Sunil D. et al., "Competition Among Flow, Dissolution, and Precipitation in Porous Media," *AIChE Journal* 35 (7), 1989, pp. 1177-1185.

Singurindy, Olga et al., "Evolution of hydraulic conductivity by precipitation and dissolution in carbonate rock," *Water Resources Research*, vol. 39 (1), 2003, pp. 8.1-8.14.

Singurindy, Olga et al., "The role of fractures on coupled dissolution and precipitation patterns in carbonate rocks," *Advances in Water Resources* 28 (2005), pp. 507-521.

Yamamoto, H. et al., "Stability Relations in the System $CaSO_4$-$H_2O$ at High Temperatures at Pressures," *American J. Science* 267-A, 1969, pp. 550-557.

\* cited by examiner

Figure 14
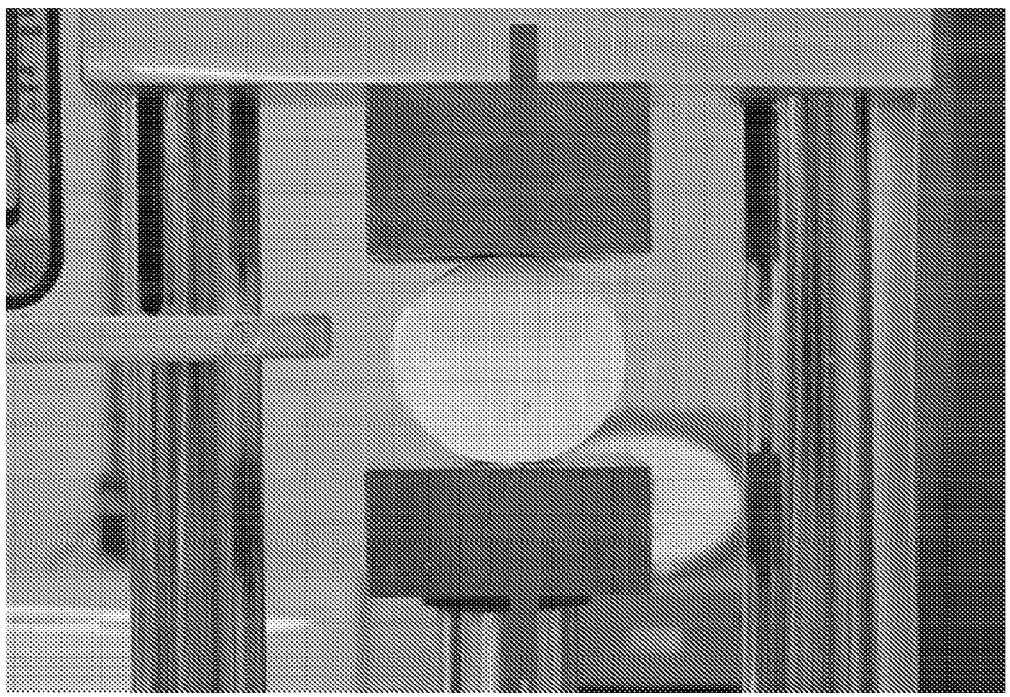
Figure 14a
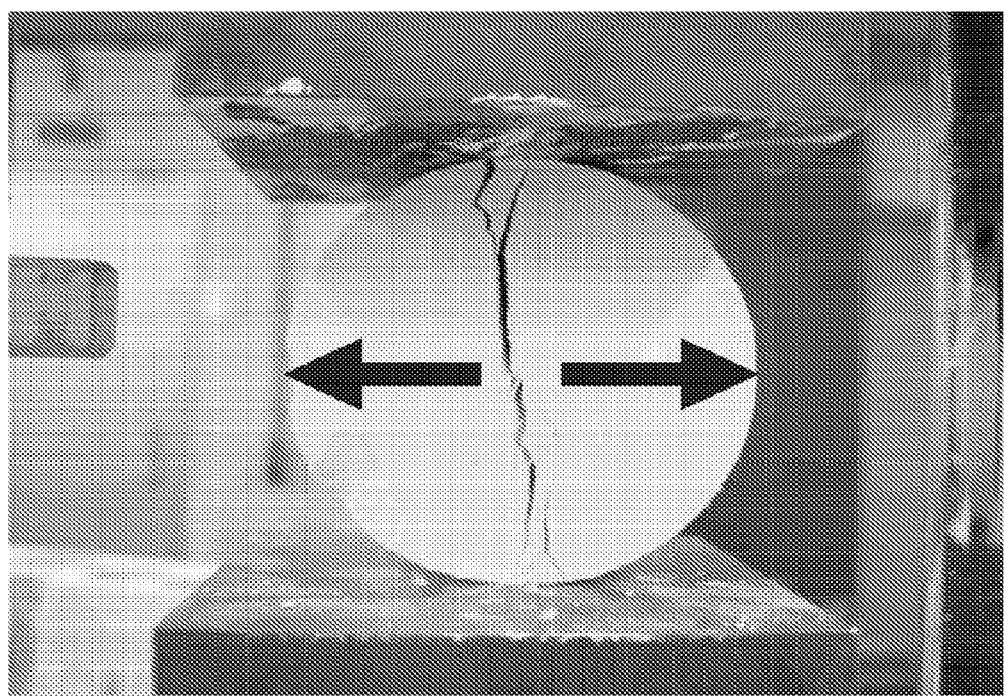
Figure 14b

Figure 16a (before)  Figure 16b (after)

SEALING OF THIEF ZONES

RELATED APPLICATIONS

This application claims the benefit under 35 U.S.C. §371 of International Application No. PCT/EP2009/065414, having an International Filing Date of Nov. 18, 2009, which claims priority to Danish Application No. PA 2009 70213, filed Nov. 18, 2009, Danish Application No. PA 2008 01618, filed Nov. 19, 2008, and U.S. Provisional Application No. 61/116,226, filed Nov. 19, 2008, the contents of all of which are incorporated herein by reference in their entirety.

FIELD OF THE INVENTION

The present invention relates to the production of hydrocarbons from a subsurface reservoir. In particular, the present invention relates to a method for reducing permeability of selected portions of a reservoir to prevent the bypass of fluids.

BACKGROUND OF THE INVENTION

Recovery of hydrocarbons from subsurface reservoirs involves the drilling of one or more wells to the depth of the hydrocarbon reservoir. After well completion, the reservoir can be drained for hydrocarbon fluids that are transported to the surface.

The reservoir typically has different zones with different permeability. If the permeability of one zone is higher than the average permeability in the reservoir it is sometimes referred to as a "thief zone".

A thief zone is a permeable zone adjacent to a less permeable zone. Typically, a thief zone is classified as a zone that has higher than average permeability compared to the rest of the reservoir. A thief zone may be a naturally occurring region of the reservoir, such as layers and fractures formed during the natural geologic process. Thief zones may also be man made, such as wormholes created by acid injection (acid is often injected in an attempt to increase hydraulic conductivity in enhanced oil recovery, see for example Rege & Fogler, *AIChE Journal* 35(7), 1989, 1177-1185, and Singurindy & Berkowitz, *Water Resources Research* 39(1), 2003, 8.1-8.14; Emmanuel & Berkowitz, *Advances in Water Research* 28, 2005, 337-344; Singurindy & Berkowitz, *Advances in Water Research* 28, 2005, 507-521; that cites Rege & Fogler), or induced fracturing (such as described in e.g. WO 02/095188 A1).

Thief zones in the form of streaks of high permeability are common in carbonate reservoirs and can speed up, and increase the risk of the production well producing large volumes of water, if such thief zone connects the production well to a source of water.

Thief zones are also detrimental to the sweep efficiency, when fluid is injected into the reservoir from injection wells to displace oil. If the reservoir is compromised by a thief zone connecting the injection well with the production well, then the production well will produce large amounts of the injected fluid. Such short-circuiting in the reservoir further bypasses considerable amounts of hydrocarbons, as the thief zone will prevent an efficient sweep of the area beyond the thief zone. Thus, the existence of thief zones can cause inefficient production of hydrocarbons from a reservoir, and further reduce the recovery of hydrocarbons.

Consequently, much effort has gone into developing methods to and products that reduce the permeability of thief zones.

Many of these have attempted to reduce permeability either at the well face or within a few feet of the bore by using e.g. cement squeezes. When the thief zone is only sealed near the well, the flow behaviour of the thief zone will continue just beyond the sealed region as if no sealing had occurred. As the typical thief zone is not confined to a few feet, but rather may extend over a large distance from the well; measures that seal the thief zone near the well are of limited value.

Time delayed gelling and in situ polymerization methods have been previously attempted in the field to plug thief zones. These methods typically suffer from difficulty of placing the monomer and catalyst the desired place, and from the complexity of achieving the correct timing. Another problem associated with time delayed gelling and in situ polymerization methods are the fact that an injected fluid front will expand radially from the injection site. Consequently, this can result in the gel and polymer sealing other areas than the thief zone, which is also detrimental to sweep efficiency.

U.S. Pat. No. 4,809,780 to Shen describes a method for selectively sealing thief zones in a formation penetrated by an injection well and a production well. This is done by injecting a heat-sensitive sealing fluid into the injection well. As shown in FIG. 1 the injected fluid preferentially travels in the high permeability zone. However, it also travels into the low permeability zone. The injection of sealing fluid is followed by injection of a push water of high salinity. Induction of electrical resistance heating preferentially heats up the thief zones. Since most of the sealing fluid passes through the thief zone they are selectively heated, and consequently sealed. The selectivity of this method is dependent on timing and the sealing not having significantly diffused into the adjacent lower permeable zones before heating is initiated. Consequently, the method appears likely to suffer from at least some of the drawbacks mentioned for the time delayed gelling and in situ polymerization methods.

SU 775 294 A1 discloses a method for isolating water-saturated formations adjacent to oil and gas deposits using a sealing solution containing waste from alkylation of paraffins in the presence of concentrated sulphuric acid. Effectiveness of the sealing of low-permeable formations at a temperature above 100° C. is enhanced by using alkylated sulphuric acid as a sealing agent. Alkylated sulphuric acid can be obtained as the waste from alkylation of paraffinic hydrocarbons with olefins in the presence of concentrated sulphuric acid as a catalyst. Calcium compounds in the water-bearing formations reacts with sulphuric acid passing insoluble barrier. The process takes about 5 h. During this time the shaft should be closed.

This document does not teach to use an acid without a content of hydrocarbons.

SU 1 709 071 discloses a method for plugging up wells bottom zone by interaction of lime suspension and clay solution preliminarily pretreated and containing water-stable compounds e.g. aluminium sulphate. The wells fluid is substituted by a clay solution which has been treated with a chemical reagent forming with the solutions calcium oxide compounds which are stable in water e.g. $Al_2(SO_4)_3$, $Fe_2(SO_4)_2$, $Na_2SiF_6$. Then the bottom hole zone is subjected to action of streams of suspension containing lime. The streams drive the clay solution into the seam where part of it is coagulated due to presence of Ca-ions and compact it. The excess of lime forms with the clay hydrates increasing effeceviness of the screen.

Hence, there is a need for a method for sealing a thief zone that provides for a simple mode of operation. A need further exists for a method that, when injected into a subsurface formation, will substantially fill a thief zone. A need further exists for a method for sealing a high permeability zone that extends a considerable distance from the well. A need further exists for a method that, after setting in a high permeability zone, provides resistance to flow at pressure gradients experienced within the reservoir during normal operations.

SUMMARY OF THE INVENTION

The object of the present invention is to provide a simple method capable of at least partially sealing selected subsurface zones.

To solve the problem, the present invention provides a method for selectively sealing a thief zone in a calcium-rich formation penetrated by a borehole comprising injecting into the thief zone a sealing fluid comprising sulfate ions ($SO_4^{2-}$) in an amount sufficient to at least partially seal the thief zone by reaction with dissolved calcium ions ($Ca^{2+}$) present in the thief zone to precipitate a calcium sulfate compound. In an embodiment of the method the borehole is an injection well. In a further embodiment the thief zone is further penetrated by a production well, such that the injection well and production well is "short-circuited".

In another embodiment of the method the sealing fluid further contains hydronium ions ($H^+$), which increases the dissolved calcium ions.

In another embodiment of the method the calcium sulfate compound is predominantly anhydrite, this type of calcium sulfate compound is common at reservoir temperatures around 80° C.

In another embodiment of the method the seal withstands at least 40 bar differential pressure, and in another embodiment of the method the seal withstands a pressure above the fracture pressure of the formation.

In another embodiment of the method the sealing fluid consists of an aqueous solution containing sulfate ions ($SO_4^{2-}$) and hydronium ions ($H^+$), and in one embodiment the $[H^+]/[SO_4^{2-}]$ ratio may be designed based on the nature of the calcium-rich formation, and nature of the thief zone. In another embodiment the ratio is higher than 2, and in yet another embodiment the ratio is lower than 2.5.

In another embodiment the injection pressure is larger than 200 bar.

In another embodiment of the method the ionic strength of the sealing fluid is increased by the addition of water-soluble salts. In one embodiment the ionic strength of the sealing fluid is larger than 20 M, which lowers the solubility product of calcium sulfate.

In another embodiment the partial seal results in water cut reduction of at least 30%.

BRIEF DESCRIPTION OF THE DRAWINGS

FIG. 14 shows a Brazilian test setup to measure tensile strength. (a) shows a slice of the fractured and resealed core placed in the test setup exerting force in the vertical direction (arrows). (b) shows the a slice of the fractured and resealed core after the experiment.

DETAILED DESCRIPTION OF THE INVENTION

The present invention provides a method for selectively sealing a thief zone in a hydrocarbon reservoir located in a calcium-rich formation and penetrated by a borehole comprising injecting into the thief zone a sealing fluid comprising sulfate ions ($SO_4^{2-}$) in an amount sufficient to at least partially seal the thief zone by reaction with dissolved calcium ions ($Ca^{2+}$) present in the thief zone to precipitate a calcium sulfate compound.

Figure 1:
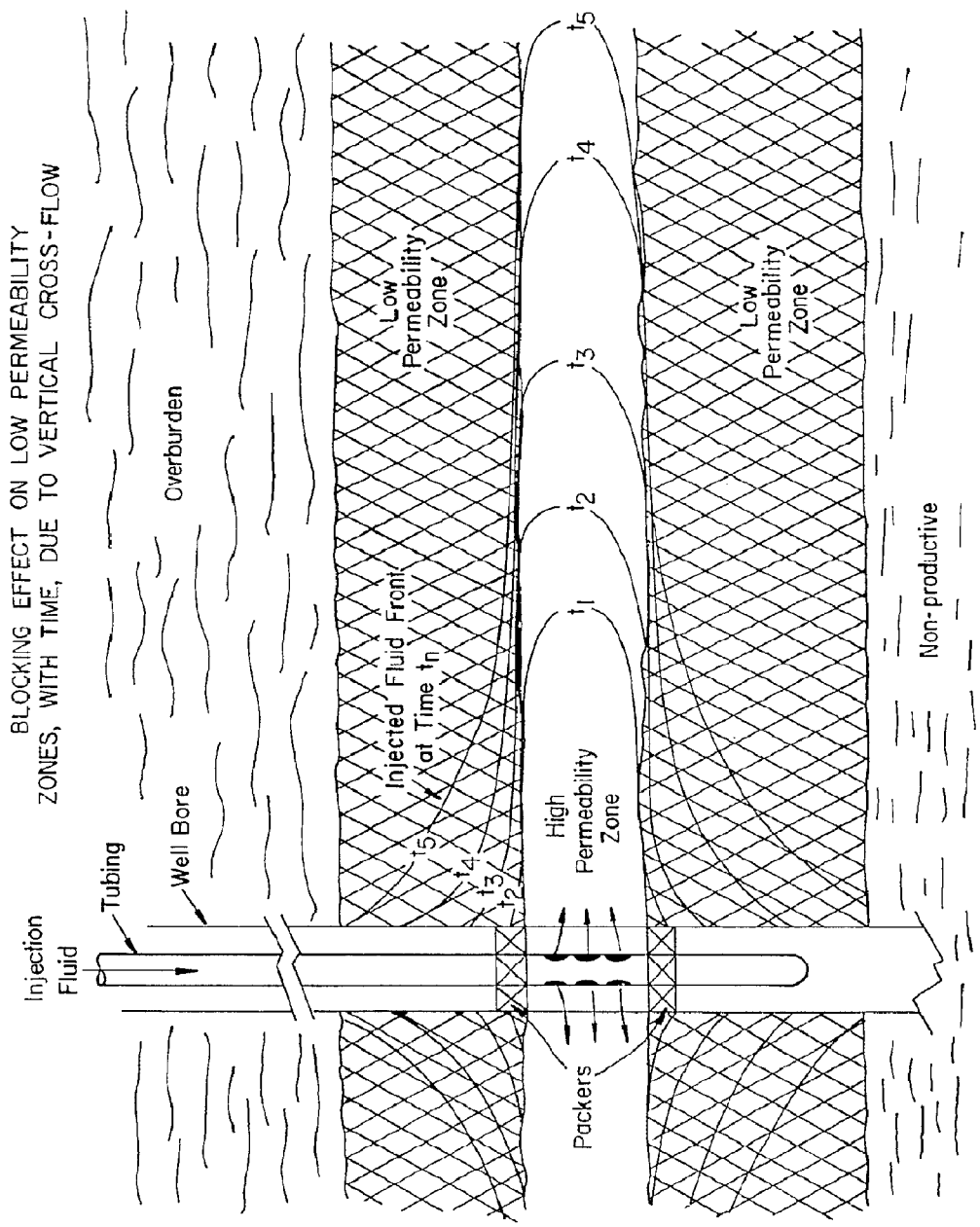
FIG. 1 shows a schematic vertical section of a well and the front of injected fluid at time $t_n$. This illustrates injection into a thief zone taken from U.S. Pat. No. 4,809,780 (Shen), wherein the wellbore has been mechanically sealed with packers so that the injection is selectively made in the thief zone. The figure further shows the blocking effect on low permeability zones, with time, due to vertical cross-flow.

The thief zone should be selectively sealed in such a way that the permeability of the adjacent less permeable zones is not significantly altered. Selectively sealing of the thief zone is obtained by providing a sealing fluid comprising sulfate ions ($SO_4^{2-}$). Since the less permeable zones also contain calcium ions, a precipitated calcium sulfate compound will be precipitated there as well. As the permeable zones adjacent to the thief zone in their very nature are less permeable than the thief zone it self, they will be sealed faster than the corresponding thief zone, and loss of sealing fluid to the adjacent less permeable zones is minimized. This can be further visualised by reference to FIG. 1, in which the injected fluid front at time $t_n$ will be less pronounced in the low permeability zones than in the high permeability zone. FIG. 1 is taken from U.S. Pat. No. 4,809,780 (Shen), wherein the wellbore has been mechanically sealed with packers so that the injection of fluid is selectively made in the thief zone i.e. the high permeability zone. FIG. 1 further shows the blocking effect on low permeability zones, with time, due to vertical cross-flow.

The hydrocarbon reservoir is a subsurface body of rock having sufficient porosity and permeability to store and transmit hydrocarbon fluids. The reservoir should be located in a calcium-rich formation, which contains an adequate amount of calcium to allow a thief zone to be sealed by precipitation of a calcium sulfate compound. Typically the subsurface body of rock consists wholly of minerals that contain calcium with minor impurities. As used herein calcium-rich formation in its broadest sense means a formation of one or more minerals that contain calcium. Within the group of calcium-rich rock is carbonate rock such as calcite ($CaCO_3$) and dolomite ($CaMg(CO_3)_2$).

The thief zone should be penetrated by a borehole, or at least be near a borehole in such a way that it is technically possible to inject the sealing fluid into the thief zone.

The injection into the thief zone may be conducted in several ways. One exemplary method may be to seal off borehole access from the injection tube to the adjacent less permeable zones by employing packers as illustrated in FIG. 1. This arrangement allows for the injection of sealing fluid primarily into the thief zone. Another exemplary method may be injection by a coil tubing string with bottom placed at the thief zone. The difference in permeability could be used to inject the fluids into the thief zone.

The sealing fluid contains at least a source of sulfate ions ($SO_4^{2-}$), which may be in the form of any water soluble sulfate salt, for example sulfuric acid ($H_2SO_4$), sodium hydrogen sulfate ($NaHSO_4$), disodium sulfate ($Na_2SO_4$) as well as other water soluble sulfate salts well-known to the skilled person. Another source of sulfate is from oxidation of hydrogen sulfide, which is often encountered as an unwanted by-product in the oil industry. The hydrogen sulfide may be catalytically oxidized to sulfate by the method described in U.S. Pat. No. 6,017,501 to Waycuilis. Typically a carrier medium such as water forms part of the sealing fluid.

The sulfate ions in the injected amount of sealing fluid should be sufficient to at least partially seal the thief zone. By partially sealed is to be understood that the thief zone should be sealed to an extent to which it is possible to operate the reservoir with a reduction of the negative effects of the thief zone, for example by improving the sweep efficiency from an injector well to a production well. Methods of evaluating the quality of the seal are known to persons skilled in the art. For example, a production logging tool may be run, which measures the amount of flow from a rotating and translating spinner downhole. One example of an acceptable partial seal may be if the original hydrocarbon decline curve is restored. This may be established by multiple production tests over a period of a few weeks. Another example of an acceptable partial seal could be measured as a reduction in water cut, which is the ratio of water produced compared to the volume of total liquids produced. For instance reducing the initial water cut with at least 30%, e.g. 96% initial water cut reduced to 67% or lower after partially sealing the zone. It is advantageous that the water cut is almost eliminated, such as for example a reduction in water cut of 70-100%, for example at least 80, 90, 95%. However, other reductions in water cut are also acceptable, such as a predominant reduction, such as for example a reduction in water cut of 40-70%, for example at least 45, 55, 65%, or a significant reduction, such as for example a reduction in water cut of 15-40%, for example at least 20, 25, 30, 35%, or a small reduction such as for example a reduction in water cut of 5-15%, for example at least 7, 10, 12%.

The injected sulfate ions will react with dissolved calcium ions from the calcium-rich formation. A calcium-rich formation such as calcite ($CaCO_3$) can be dissolved by water flowing in the formation. The amount of dissolved calcium ions depends on several factors including the water temperature, pH, and dissolved ion concentrations. Calcite exhibits an unusual characteristic called retrograde solubility in which it becomes less soluble in water as the temperature increases. It may be necessary to add a source of $H^+$ to the sealing fluid in order to dissolve a sufficient amount of calcium to at least partially seal the thief zone by reaction with the sulfate ions present in the sealing fluid. The addition of a source of $H^+$ to the sealing fluid is discussed in a further embodiment according to the invention.

Figure 2:
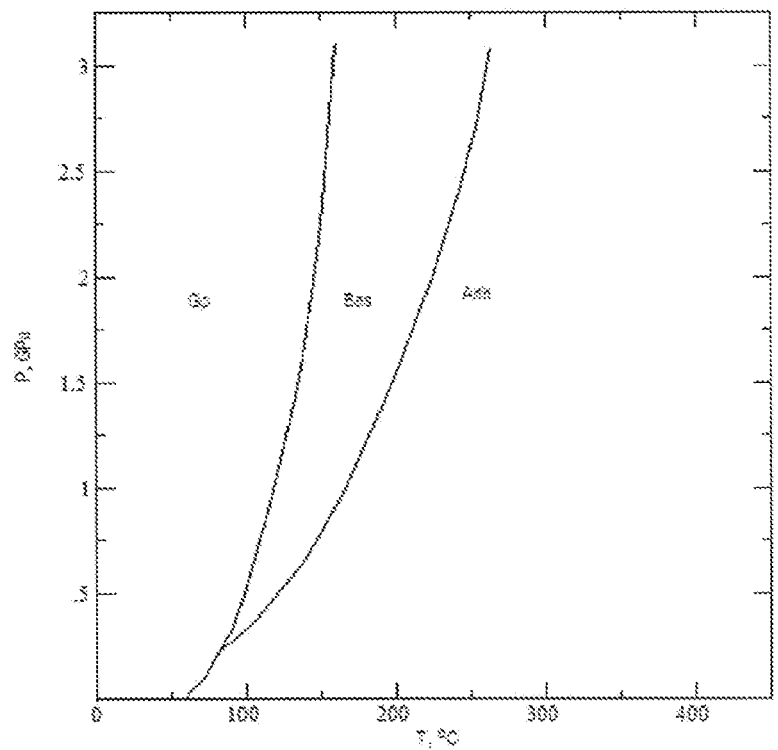
FIG. 2 shows a P-T phase diagram showing the stability regions for three forms of calcium sulfate (H. Yamamoto, G. C. Kennedy, *Am. J. Sci* 267A, 1969, 550-557). The three forms are Gypsum (Gp, $CaSO_4$, $2H_2O$), Basanite (Bas, $CaSO_4$, ½$H_2O$) and anhydrite (Anh, $CaSO_4$).

When the solubility product of calcium sulfate is exceeded calcium sulfate will precipitate. Depending on the pressure and temperature in the reservoir calcium sulfate may precipitate as gypsum (Gp, $CaSO_4, 2H_2O$), basanite (Bas, $CaSO_4, \frac{1}{2}H_2O$) or anhydrite (Anh, $CaSO_4$). FIG. 2 illustrates the different stability regions for these three forms of calcium sulfate as FIG. 2 shows a P-T phase diagram showing the stability regions for the three forms of calcium sulfate i.e. gypsum, basanite and anhydrite (H. Yamamoto, G. C. Kennedy, Am. J. Sci 267A, 1969, 550-557). The precipitated calcium sulfate compounds cement the existing rock grains together and/or fill fractures thereby sealing the thief zone.

In one embodiment the calcium sulfate compound is predominantly anhydrite. Anhydrite will be formed in accordance with the pressure and temperature ranges described in FIG. 2 i.e. at relatively high temperatures. Many thief zones and/or reservoirs have temperature and pressure ranges such that anhydrite will be formed when calcium sulfate precipitates. Typical reservoir pressures are around 100 bar (0.01 GPa) or higher, and temperatures are around 80° C.

The molar amount of precipitated calcium sulfate compound required to, at least partially, seal the thief zone depends on what type of calcium sulfate compound that will be precipitated. The molar volume ($V_m$) may be taken as a measurement of how much material that needs to be precipitated. The molar volume is the volume occupied by one mole of a substance at a given temperature and pressure. It is equal to the molar mass (M) divided by the mass density ($\rho$). $V_m$ is typically measured in cubic centimeters per mole ($cm^3$/mol).

In the table below the molar volume of calcium carbonate ($CaCO_3$), gypsum (Gp, $CaSO_4, 2H_2O$) and anhydrite (Anh, $CaSO_4$) have been calculated.

Molar Volumes for Different Calcium Compounds

|  | Molecular weight (M, g/mol) | Mass density (p, g/cm$^3$) | Molar volume ($V_m$, cm$^3$/mol) |
|---|---|---|---|
| Calcite ($CaCO_3$) | 100.09 | 2.71 | 36.9 |
| Gypsum ($CaSO_4, 2H_2O$) | 172.17 | 2.31 | 74.4 |
| Anhydrite ($CaSO_4$) | 136.14 | 2.97 | 45.8 |

From the table of molar volumes above it can be seen that 1 mole of dissolved calcite gives rise to approximately 100% increase in the volume when reprecipitated as gypsum. Further the precipitation of the same amount of anhydrite only gives rise to approximately 25% increase in the volume. Consequently, less moles of gypsum need to be precipitated compared to anhydrite in order to fill the same void volume.

Figure 3:
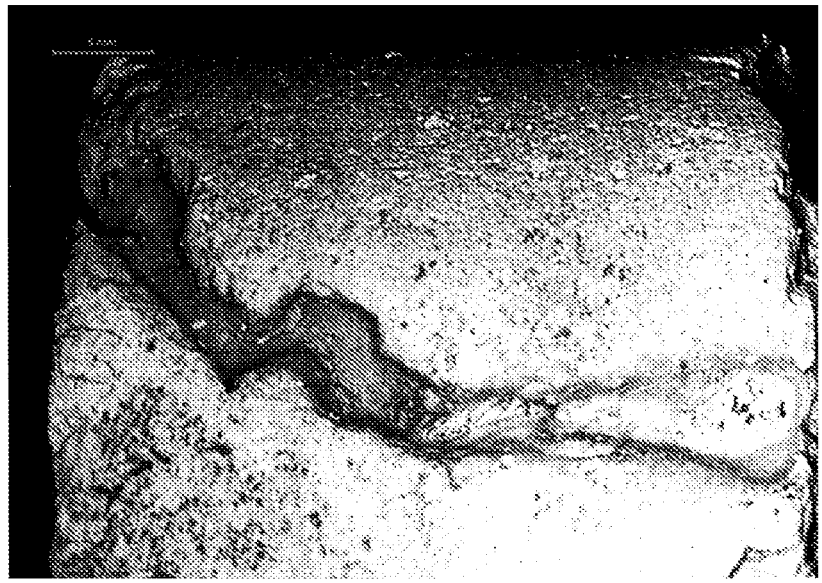
FIG. 3 shows a chalk core cross-section revealing a wormhole due to acid injection.

In one embodiment the borehole is an injection well, which is a well in which fluids are injected rather than produced. The objective of an injection well is typically to maintain reservoir pressure, or to sweep an area of a reservoir with e.g. water or gas. The efficiency of such a sweep depends for example on the volume of the reservoir contacted by the injected fluid, as well as fractures in the reservoir and permeability. A method typically referred to as matrix acidizing or "acid jobs" involve the treatment of the formation matrix with a reactive acid to enlarge the pore spaces, or in the case of calcium-rich formations, dissolve the entire formation matrix. In calcium-rich formations wormholing is often associated with matrix acidizing (see FIG. 3). If the permeability after such an acid job becomes too high, and/or the wormholes create a thief zone, e.g. one that connects the injection well with the production well, the method of the present invention will be able to seal the artificially created thief zone.

In another embodiment the thief zone is further penetrated by a production well. Typically an injection well and a production well may be around 200 m apart. However, this distance is based on economic criteria in combination with flow dynamic reservoir modelling. From the historical data around the world there are well patterns, which have distances as close as 25 m, and other where direct communication between wells is demonstrated of a few thousand meters. When both a production well, and an injection well is connected through a thief zone this creates a short circuit, which bypasses a considerable amount of oil in the reservoir. As a direct result, that specific part of the reservoir will not produce in an efficient way, and will lead to increased water production. Consequently, sealing such a thief zone by injecting a sealing fluid according to the invention will increase the efficiency of the reservoir.

In another embodiment the sealing fluid further contains hydronium ions ($H^+$). When the dissolved calcium ions are not present in an amount large enough to at least partially seal the thief zone by reaction with dissolved calcium ions ($Ca^{2+}$) present in the thief zone to precipitate a calcium sulfate compound it is necessary to increase the concentration of calcium ions. This can be done by increasing the dissolution of the calcium-rich formation by adding hydronium ions ($H^+$). Hydronium ions may be added in the form of acids, such as for example perchloric acid ($HClO_4$), hydroiodic acid (HI), hydrobromic acid (HBr), hydrochloric acid (HCl), sulfuric acid ($H_2SO_4$), nitric acid ($HNO_3$), chloric acid ($HClO_3$), bromic acid ($HBrO_3$), hydrofluoric acid (HF), perbromic acid ($HBrO_4$), iodic acid ($HIO_3$), and periodic acid ($HIO_4$), acetic acid ($CH_3CO_2H$), formic acid ($HCO_2H$) and mixtures thereof. Essentially all that is needed is an acid in an amount and strength that will produce the required amount of hydronium ion ($H_3O^+$ or $H^+$). For purposes of simplicity, $H_3O^+$ is often replaced in a chemical equation with $H^+$. However, it should be noted that a bare proton simply does not exist in water but instead is bound to one of the lone pairs of electrons on the $H_2O$ molecule. This creates the hydronium ion and gives its single O atom a formal charge of +1.

The function of the hydronium ions are to increase the concentration of calcium ions in solution, and the function of the sulfate ions are to provide a suitable reaction partner to calcium that will precipitate a calcium sulfate compound. In one embodiment the sealing fluid consists of an aqueous solution containing sulfate ions ($SO_4^{2-}$) and hydronium ions ($H^+$). Depending on the amount of dissolved calcium ions, and the size of the thief zone to be sealed, various amounts, concentrations and ratios of $H^+$ and $SO_4^{2-}$ is needed. The section titled "Chemical reactions—theoretical considerations" describes the theoretical considerations regarding the composition of the sealing fluid, when a mixture of sulfuric and hydrochloric acid is injected into a calcium-rich formation. Furthermore example 1, and the section titled "Analysis of the static experiments", as well as example 2-11 and the section titled "Analysis of the flow experiments" further elaborates on the composition of the sealing fluid based on a mixture of HCl and $H_2SO_4$.

In another embodiment the $[H^+]/[SO_4^{2-}]$ ratio is designed based on the nature of the calcium-rich formation, and nature of the thief zone. Reference is made to both the section titled: "Analysis of the flow experiments", and the examples. In another embodiment the ratio is higher than 2. In yet another embodiment the $[H^+]/[SO_4^{2-}]$ ratio is lower than 2.5.

In the examples, mixtures of HCl and $H_2SO_4$ have been used as a source of $H^+$ and $SO_4^{2-}$, but as described above there are many other sources of hydronium ions and sulfate. HCl may be manufactured on site with a suitable chloride, such as NaCl and concentrated sulfuric acid. This is well-known to persons skilled in the art. Consequently, only one acid component needs to be transported to the site.

The seal provided by the invention can withstand a pressure above the fracture pressure of the formation. The experimental results of the Brazilian tests demonstrates that fractured and resealed chalk samples have comparable strengths to the original chalk samples. Furthermore, during the Brazilian test all the fractured and resealed samples had a new fracture in the vertical direction. This new fracture was not influenced by the fracture path of the old sealed fracture. In example 12 the sealing of a core with a horizontal fracture (FIG. 12) is shown. It can be seen on FIG. 13 that is a 3D rendering of CT scans of the core after completely sealing the horizontal fracture. Towards the end of the sealing, the injection pressure is increased due to the sealing of the thief zone. This can result in formation of induced fractures (hydraulic fracturing) perpendicular to the injection. The sealed thief zone withstands the increased pressure that fractures other parts of the formation. One of the advantages associated with the sealed thief zone withstanding the increased pressure that fractures other parts of the formation is that hydraulic fracturing may be repeated or done more aggressively in order to increase permeability of certain parts of the reservoir, while at the same time "accidental" fractures that create unwanted thief zones can be sealed again. When these "accidental" thief zones are sealed using the method of the present invention it will withstand the applied pressure, and hydraulic fracturing can be resumed, thereby increasing oil production.

In another embodiment the seal withstands at least 40 bar differential pressure, for example at least 100 bar, at least 150 bar, at least 200 bar, at least 250 bar, at least 300 bar, at least 330 bar, at least 350 bar, at least 400 bar. The differential pressure is measured as the difference of pressure on the production side and the injection side. Typical differential pressures can be as high as 330 bar.

It is demonstrated in example 15 that resealed fractures withstands at least 320 bar, and a repeated differential pressure fluctuation between injection and production side of more than 150 bar without refracturing.

In another embodiment a flow rate of sealing liquid of 5-100 bbls/min is applied. The flow rate should be adjusted such that it is not too slow, which will result in the thief zone being sealing too close to the injection well. Neither should it be too fast, which will result in sealing of the thief zone too far away from the injection well, or simply keep the precipitated mass in suspension. Reference is made to both the section titled: "Analysis of the flow experiments", and example 4 that relates to the effects of flow rate.

Example 4 and the discussion are based on laboratory experiments. However, the examples provides the skilled person with a general understanding of how to adjust the flow rate in order to effectively seal the thief zone. Consequently, in one embodiment a flow rate is applied that is sufficient to seal the thief zone to an extent to which it is possible to operate the reservoir with a reduction of the negative effects caused by the thief zone.

In another embodiment the injection pressure is larger than 200 bar. The injection pressure may even be negative, if the pressure in the reservoir is less than the pressure of the hydrostatic column in the injection well.

In another embodiment the ionic strength of the sealing fluid is increased by the addition of water-soluble salts. Increasing the ionic strength of the sealing fluid lowers the solubility product of the calcium sulfate compound due to the phenomenon called the salting down effect. In another embodiment a push fluid containing a saturated or near-saturated solution of a salt is injected after injection of the sealing fluid. The salt used to increase the ionic strength may be the active salts containing hydronium ions and sulfate ions themselves, or be another salt such as NaCl and KCl, The ionic strength on a concentration basis is defined as $$I_c = \frac{1}{2}\sum c_B z_B^2$$

where the sum goes over all the ions B. $z_B$ is the charge number of ion B. Exemplary ionic strengths for the sealing fluid or the push fluid may be: >20 M, >30 M, >40 M, >50 M, >60 M, >70 M. In another embodiment the ionic strength of the sealing fluid is larger than 20 M.

The invention may also be practised in the context of cementing boreholes, or drilling a bore hole. Drilling mud may be lost to a thief zone connected to a zone with lower pressure than the one in the borehole, or to a fracture. In this case the thief zone may be sealed only a few feet from the wellbore by applying the teaching of this specification.

The invention may further be applied in an analogous way to seal the surrounding wellbore in relation to chemically removing downhole equipment, in order to minimize loss of the equipment dissolution mixture. This is described in the co-pending application titled "Downhole Equipment Removal System" (internal reference: P80706078, DK patent application PA 2008 01617, U.S. provisional application 61/116,215) with concurrent filing date and similar inventorship (hereinafter referred to as "the co-pending application"), which is hereby incorporated by reference in its entirety.

When the downhole equipment to be dissolved is penetrated locally by corrosion or collapse, access is provided to the formation surrounding the borehole. This can cause leaking of the equipment dissolution mixture to the earth formation in which the well was drilled, resulting in the need to introduce more equipment dissolution mixture to dissolve the downhole equipment.

The leaking will further add to the cost of dissolving the downhole equipment, and it is consequently advantageous to minimize any leaking of active equipment dissolution mixture, by creating a flow barrier between the earth formation in which the well has been drilled, and the downhole equipment to be dissolved.

When the downhole equipment is situated in a calcium-rich reservoir it is advantageous to use an acid in combination with a source of sulfate ions ($SO_4^{2-}$), for example sulfuric acid itself. The sulfuric acid can be present in any concentration from around 1-98.3%. The sulfuric acid will dissolve the calcium-rich material, such as e.g. calcium carbonate $CaCO_3$, which in turn will re-precipitate as calcium sulfate with varying amounts of water, such as for example gypsum ($CaSO_4$, $2H_2O$) thereby creating a flow barrier that effectively minimizes the leak of equipment dissolution mixture to the earth formation in which the well was drilled. Since gypsum and related calcium sulphate materials have a higher molar volume than calcium carbonate itself ($CaCO_3$~37 cm³/mol vs. gypsum ~75 cm³/mol), any cracks in the calcium-rich formation surrounding the downhole equipment will be plugged and sealed by excess volume of calcium sulphate resulting in a calcium sulphate lined formation, which significantly reduces or stops the leak. It is further advantageous to have, and be able to contain the equipment dissolution mixture both on the inside and the outside of the downhole equipment. This is because the equipment dissolution mixture will be in contact with both sides of the pipe that make up a large part of the downhole equipment to be dissolved. The ability to contact the inside as well as the outside of the pipe, without significant leaks of the equipment dissolution mixture to the surrounding formation effectively doubles the corrosion rate, and thereby reduces the time of substantial corrosion considerably.

When the equipment dissolution mixture for calcium-rich reservoirs comprises sulfuric acid, it can further be added another source of $H^+$, such as hydrochloric acid. Increasing the ratio between $H^+$ (that dissolves calcium-rich material, such as e.g. $CaCO_3$) and $SO_4^{2-}$ (which precipitates a calcium sulfate compound) results in more dissolved calcium-rich material that in turn can be precipitated. Increasing the ratio $H^+/SO_4^{2-}$ can be beneficial if a larger plug of gypsum is to be formed.

Consequently, the teaching of this specification can be applied analogously to seal a wellbore by precipitation of a calcium sulfate compound as described in the co-pending application.

Chemical Reactions—Theoretical Considerations

The major reactions that take place when a mixture of sulfuric and hydrochloric acid is injected into a calcium-rich formation are:

$$HCl \rightarrow H^+ + Cl^- \quad (1)$$

$$H_2SO_4 \rightarrow H^+ + HSO_4^- \quad (2)$$

$$HSO_4^- \leftrightarrow H^+ + SO_4^{2-} \tag{3}$$

$$CaCO_3 + H^+ \rightarrow Ca^{2+} + HCO_3^- \tag{4}$$

$$SO_4^{2-} + Ca^{2+} \rightarrow CaSO_4 \tag{5}$$

$$HCO_3^- + H^+ \rightarrow H_2O + CO_2 \tag{6}$$

The reactions 1, 2 and 4 completely shift to the right until one of the reactants basically ceases to exist. Reaction 6 occurs in the static experiments (see e.g. example 1), but not in the flow experiments (see e.g. example 2-12) because the solubility of $CO_2$ depends upon pressure. Reaction 5 takes place when the solubility product of anhydrite is exceeded. Reaction 3 depends on the second dissociation constant of sulphuric acid. Wu et al. (Wu, Y. C., Feng, D., The second dissociation constant of sulfuric acid at various temperatures by the conductometric method, *Journal of Solution Chemistry* 24 (1995), 133-144) investigated the second dissociation constant of sulfuric acid at various temperatures and applied the following relations:

$$pK_2 = 5.7917 - \frac{1135.3}{T} \tag{2.1}$$

In this formula, $K_2$ is given by:

$$K_2 = \frac{[H^+][SO_4^{2-}]}{[HSO_4^-]} \tag{2.2}$$

When using acid injection, the $H^+$ concentration in equation 2.2 is much larger than the $SO_4^{2-}$ concentration. Combined with formula 2.1, it implies that the $SO_4^{2-}$ concentration is low compared to the $H_2SO_4$ concentration and that it depends highly on the temperature. Equation 2.2 also shows that the $SO_4^{2-}$ concentration increases when $H^+$ ions are reacting with calcium, because $K_2$ remains constant. For precipitation of anhydrite it is necessary that the solubility product $K_s$ of anhydrite is exceeded. $K_s$ is a function of the standard molar Gibbs free energy $\Delta G^0$, $$\Delta G^0 = -RT \ln K_s \tag{2.3}$$

in which R is the gas constant. When the standard molar reaction enthalpy $\Delta H^0$ for a certain temperature is known, $K_s$ can be solved for an unknown temperature by:

$$K_s = -\int \frac{\Delta H^0}{T^2} dT \tag{2.4}$$

As anhydrite is a solid, its activity equals 1. So the solubility product of anhydrite is given by the product of the activities of $Ca^{2+}$ and $SO_4^{2-}$.

$$K_s = aCa^{2+} aSO_4^{2-} \tag{2.5}$$

Subsequently, equations 2.2 and 2.3 show that the solubility product of anhydrite is a function of temperature and the ion activities.

For the equations in can be concluded that:
For solutions with a high $H^+/SO_4^{2-}$ ratio the $SO_4^{2-}$ concentration is lower than for solutions with a low $H^+/SO_4^{2-}$ ratio. This low $SO_4^{2-}$ concentration also implies that the solubility product is less likely to be exceeded. This leads to a more dissolution dominated environment for higher concentration ratios.

The solubility product of anhydrite increases with increasing temperature and it leads to more ions staying in the solution. Hence, in practice, if a fluid cools down in the production well, this can lead to precipitation because the solubility product lowers again.

A large increase in the ionic strength of a solution can result in an earlier precipitation of the anhydrite. This is achieved by the addition of large quantities of a good soluble salt to the solution until the solubility of this salt is reached. When this solution is injected into the chalk, the anhydrite is almost insoluble. This process is called the salting down effect.

Figure 4:
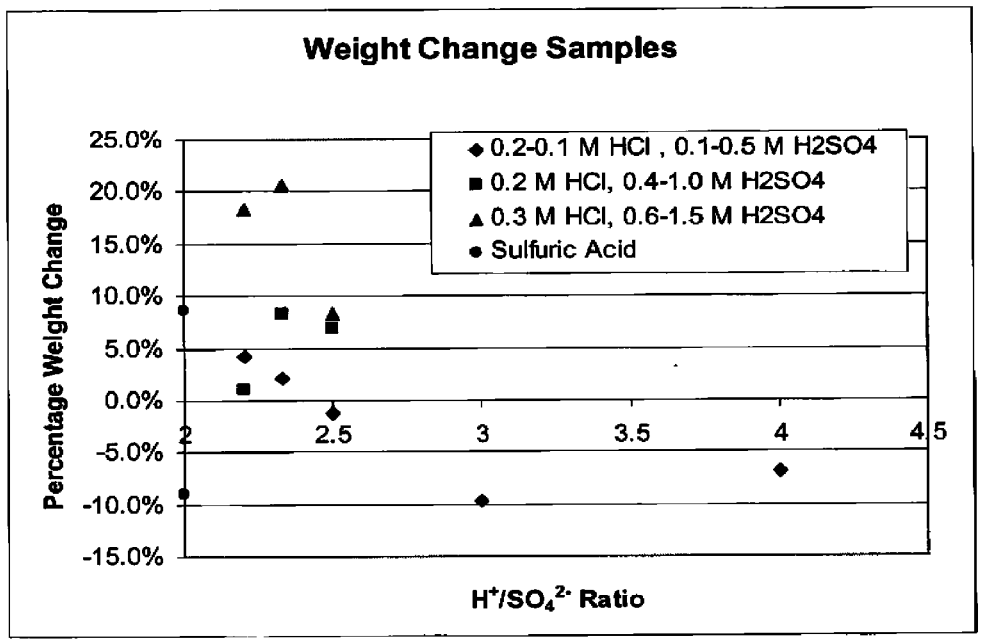
FIG. 4 relates to the static experiments described in example 1 and shows a plot of the weight change in percent for various $H^+/SO_4^{2-}$ ratios of the sealing fluid.

Analysis of the Static Experiments (See e.g. Example 1)
Weight Change of Samples FIG. 4 shows the weight change of the cubic chalk samples of example 1 before and after the experiment due to the reactions with the acid mixture. Weight loss is due to dissolution of the calcium carbonate. Weight gain is due to reaction with sulfate ions, which are heavier than the carbonate ions and by that resulting in increasing mass.

FIG. 4 shows that low concentrations of $SO_4^{2-}$ i.e. $H^+/SO_4^{2-} \geq 2.5$, induce a mass decrease of the samples. The experiments with low acid concentrations are performed with larger amounts of solution. For these solutions more calcium remains in solution before the solubility product is reached. Best results are obtained for solutions with an $H^+/SO_4^{2-}$ ratio below 2.5. A trend is observed that with a decreasing $H^+/SO_4^{2-}$ ratio the weight change is increasing.

Solution Analysis with HPLC

Figure 5:
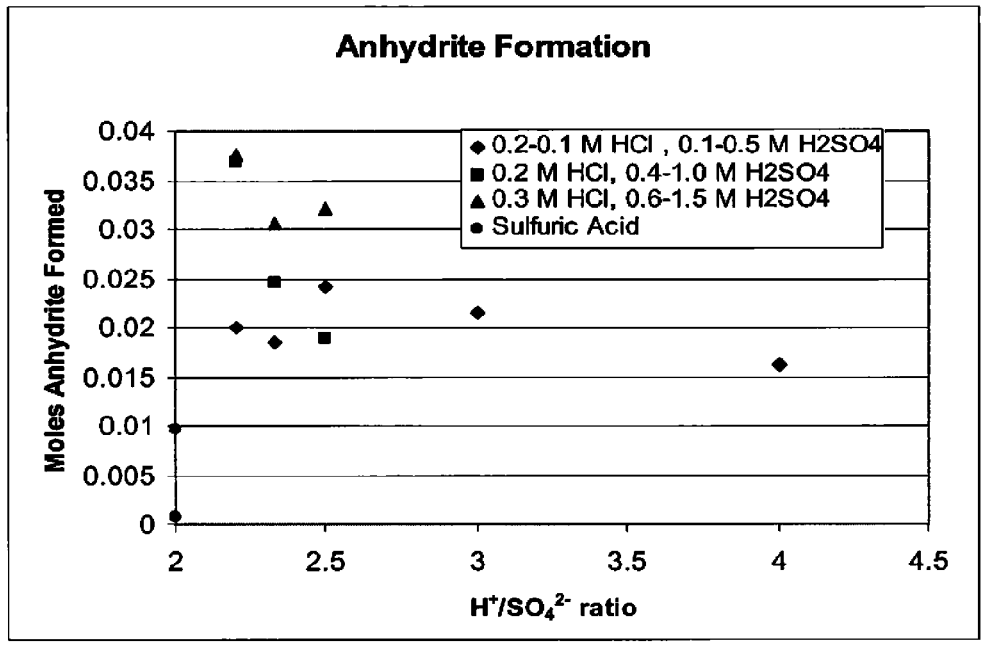
FIG. 5 relates to the static experiments described in example 1 and shows a plot of the moles of anhydrite formed for various $H^+/SO_4^{2-}$ ratios of the sealing fluid.

FIG. 5 shows the total amount of newly created anhydrite for the different samples, which is derived from the sulfate mass balance. After the experiment, the amount of sulfate of the remaining solution is determined with HPLC. This amount is compared to the concentration in the original solution and gives the amount of anhydrite formed.

Figure 6:
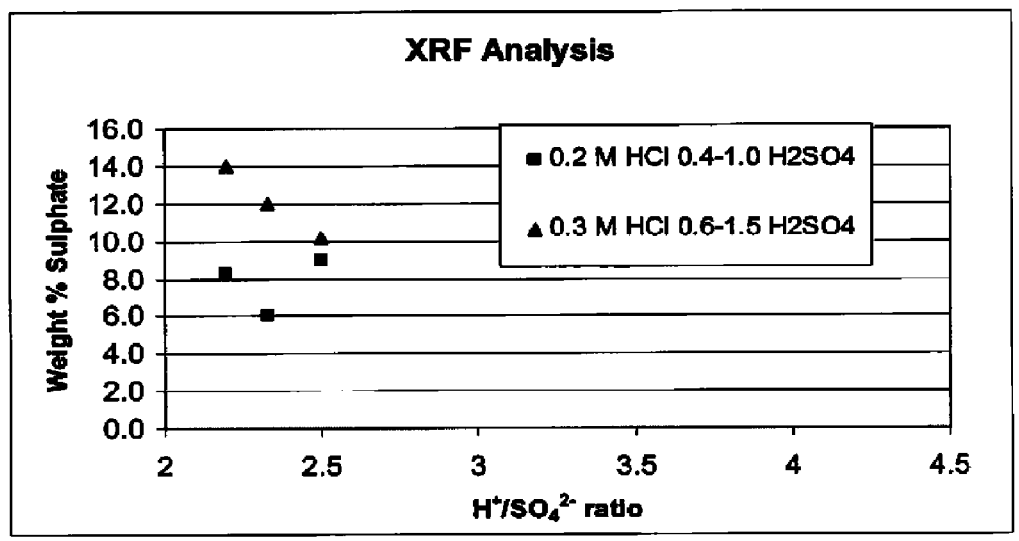
FIG. 6 relates to the static experiments described in example 1 and shows a plot of the weight percent of sulfate for various $H^+/SO_4^{2-}$ ratios of the sealing fluid based on x-ray fluorescence (XRF) spectroscopy analysis.

FIG. 5 shows that pure sulfuric acid leads to low anhydrite formation. Best results are obtained from the solutions having the highest concentration of $SO_4^{2-}$. After the experiments all the samples were cut into two parts to see how far the solution penetrated into the chalk matrix. For all the samples having an $H^+/SO_4^{2-}$ ratio higher than 2, a smaller core of chalk remained inside a bigger cube of anhydrite Sample Analysis with XRF XRF analysis was performed on 6 samples, sample ID: 16, 18, 19, 23, 24 and 26. FIG. 6 shows that the experiments with higher molarity result into a higher sulfate content of the sample i.e. more anhydrite is formed.

Conclusion Based on the Static Experiments

Solutions having a low $SO_4^{2-}$ concentration lead to more dissolution than precipitation.

The use of concentrated pure sulphuric acid leads to clogging of the matrix of the cubes, directly at the original faces.

Best results are obtained for concentrated solutions with a low $H^+/SO_4^{2-}$ ratio.

Due to free void during the experiment, crystal growth occurs on outer sides of cubes, which leads to low or no reduction of porosity. This phenomenon is confined to the static experiments.

Analysis of the Flow Experiments

This section deals with the results obtained from example 2-11

Flow Rate

At low flow rates clogging already occurs in the core. Higher flow rates lead to later clogging. With flow rates of 0.500 and 1.000 ml/min, clogging occurs after the core, in the production tubing system. At these higher flow rates, it is possible that the precipitation reaction is too slow to happen in the core and therefore possibly occurs due to the lower temperature after the core in the tubing system. It results into precipitation of anhydrite, since the solubility product of anhydrite is lower at lower temperatures.

Time of Injection

The time experiments show that closing of the drilled hole occurs first. Thereafter, other phenomena take place like wormholing and matrix reactions.

Type of Opening

The original holes and non-oriented fracture openings always clog by cementation. A larger diameter hole also fills up, but it takes more time. The period up to cementation is longer and it is recognized by the period of very low differential pressures over the sample.

Changing Ratio

The differences between the experiments with the different acid ratios are small. Visual inspection of the cores indicates that in the low acid ratio of 2.2 less wormholes are created. However, more serious reactions with the matrix are observed. This is the opposite when compared with the experiments with a higher ratio.

Increasing Concentration

An increasing concentration of $H^+$ and $SO_4^{2-}$ induces higher speed of reactions and clogging and anhydrite cementation occurs at the front end of the core. An increased concentration has a higher mass flow of acid and sulfate per time unit. Furthermore, there is less fluid available so the solubility product exceeds sooner. Inspection of the core showed that the clogging and the cementation reaction caused by the formation of anhydrite took place in the front end of the core. This resembles the results of the test with the low flow rate of 0.125 ml/min in the flow rate study and indicates that these two parameters are correlated.

Higher Back Pressure

The results show that with an increased back pressure and injection pressure the core clogs faster. Also, there are fewer wormholes. Increasing the back pressure also needs an increase in annular pressure. The increase in annular pressure may compress the core and causes earlier clogging and the development of less wormholes. The compressive load downhole may be calculated by multiplying the vertical depth measured from the surface to the formation multiplied with the rock density. A typical value is 2.3 kg/dm³. Consequently, at 2000 m depth the equivalent vertical pressure is 460 bar.

EXAMPLES

The following examples are all conducted on model fractures made in the lab. The skilled person would be able to understand the significance of each experiment, and know how to apply these results in a full size reservoir with thief zones in accordance with the teaching of this specification.

Example 1

Static Experiments

Static experiments were performed on cubic chalk samples of 8 cm³. The samples were sawed and then put in an ultrasonic bath to remove the saw dust. Thereafter, the samples were dried and weighed. Next, the samples were saturated with water by using a vacuum chamber. After the experiments all samples were rinsed, filtered and weighted. The remaining solution was analysed for residual sulfate ions. In the static experiments different concentrations of acid mixtures were used, and the cubic chalk samples were submerged in the acid mixtures. The temperature was 80° C.

TABLE 1

Acid mixtures used in static experiments

| Sample ID (#) | HCl (M) | $H_2SO_4$ (M) | Acid ratio |
|---|---|---|---|
| 7 | 0 | 0.1 | 2 |
| 9 | 0 | 1.0 | 2 |
| 10 | 0.2 | 0.1 | 4 |
| 11 | 0.1 | 0.1 | 3 |
| 12 | 0.1 | 0.2 | 2.5 |
| 14 | 0.1 | 0.3 | 2.33 |
| 13 | 0.1 | 0.5 | 2.2 |
| 16 | 0.2 | 0.4 | 2.5 |
| 18 | 0.2 | 0.6 | 2.33 |
| 19 | 0.2 | 1.0 | 2.2 |
| 23 | 0.3 | 0.6 | 2.5 |
| 24 | 0.3 | 0.9 | 2.33 |
| 26 | 0.3 | 1.5 | 2.2 |

The results from the individual chalk samples are presented in Table 2. To compare the different chalk samples, three different methods are used:
Difference of weight before and after an experiment.
Mass balance determination of sulfate by using High Performance Liquid Chromatography (HPLC).
XRF analysis for element analysis.

TABLE 2

Results of the static experiments

| Sample ID | 7 | 9 | 10 | 11 | 12 | 14 | 13 | 16 | 18 | 19 | 23 | 24 | 26 |
|---|---|---|---|---|---|---|---|---|---|---|---|---|---|
| Weight (g) | 11.1204 | 11.2166 | 10.1906 | 10.9504 | 11.5079 | 11.3482 | 11.9014 | 11.2678 | 10.7800 | 11.2598 | 10.9532 | 11.2535 | 11.3005 |
| Volume (cm³) | 7.94 | 8.17 | 7.86 | 8.03 | 8.04 | 8.06 | 8.29 | 8.01 | 8.18 | 7.95 | 7.89 | 7.98 | 7.93 |
| Bulk Density (g/cm³) | 1.40 | 1.37 | 1.30 | 1.36 | 1.43 | 1.41 | 1.44 | 1.41 | 1.32 | 1.42 | 1.39 | 1.41 | 1.42 |
| Porosity | 0.52 | 0.52 | 0.53 | 0.51 | 0.49 | 0.501 | 0.49 | 0.49 | 0.52 | 0.50 | 0.50 | 0.49 | 0.49 |
| End Weight (g) | 10.2065 | 12.0777 | 9.4947 | 9.8908 | 11.3691 | 11.5827 | 12.4112 | 12.0446 | 11.6692 | 12.6033 | 11.8592 | 13.5750 | 13.3703 |
| Weight Change (g) | −0.9139 | 0.8611 | −0.6959 | −1.0596 | −0.1388 | 0.2345 | 0.5098 | 0.7768 | 0.8892 | 1.3435 | 0.9060 | 2.3215 | 2.0698 |
| Anhydrite Formed (mol) | 0.0008 | 0.0097 | 0.0162 | 0.0215 | 0.0240 | 0.0184 | 0.0199 | 0.0189 | 0.0246 | 0.0368 | 0.0321 | 0.0305 | 0.0376 |

Example 2

Flow Experiments—General Experimental Setup

In the dynamic flow experiments with a large core holder, various parameters concerning acid injection into chalks have been investigated:
  Flow rate.
  Time of injection.
  Acid ratio.
  Concentration.
  Back pressure.
  Type of opening.

The core dimensions in these tests are 48 mm diameter and 150-180 mm in length. To prevent an outflow of fines it was chosen to flush the cores with brine instead of water before the acid injection.

Figure 7:
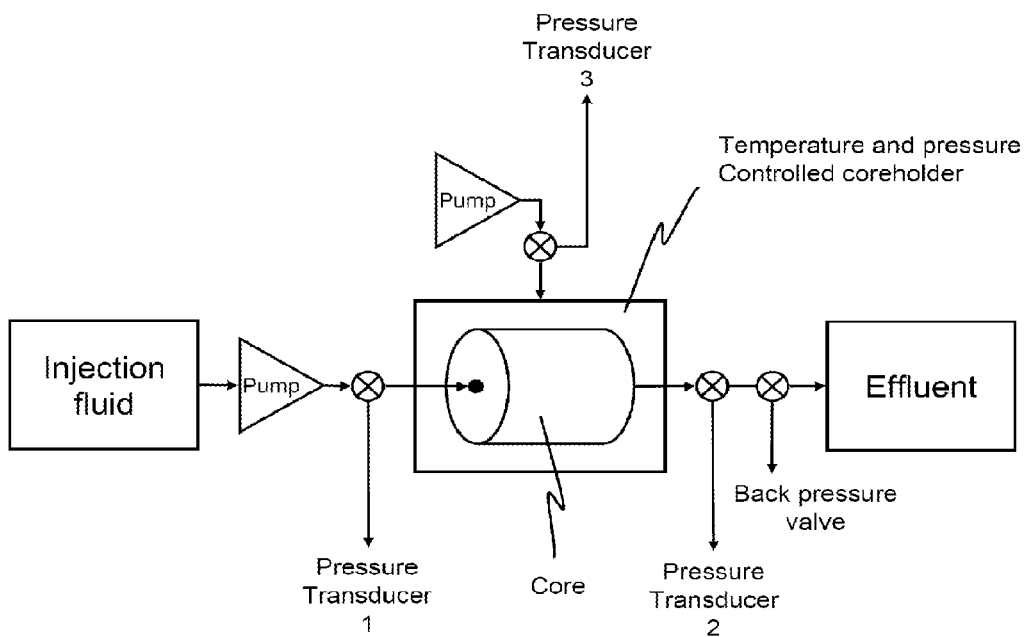
FIG. 7 shows a schematic diagram of the experimental setup for the flow experiments. The current setup caps the differential pressure between pressure transducer 1 and 2 to 40 bar.

The general experimental setup for the flow experiments on fractured chalk cores is described in the following with reference to the schematic diagram shown in FIG. 7. Injection fluid is pumped through the fracture of a chalk core, and the effluent is collected. The injection pressure is measured with pressure transducer 1, and the effluent pressure is measured with pressure transducer 2. The setup caps the differential pressure between pressure transducer 1 and 2 to 40 bar. The core itself is situated in a coreholder that is temperature and pressure controlled. The temperature is fixed at 80° C. The pressure inside the coreholder is kept around 100-140 bar, typically around 110 bar. The pressure inside the coreholder is measured using pressure transducer 3 and is also referred to as the annular pressure. The fixed temperature at 80° C. has the effect that anhydrite ($CaSO_4$) is precipitated, and not gypsum ($CaSO_4$, $2\ H_2O$) as shown on the phase diagram in FIG. 2.

Example 3

Flow Experiments—Obtaining Data

Flow experiment 10 was the first experiment with a 3 mm hole drilled into the core. The flow rate was 0.250 ml of 0.3/0.9 M $HCl/H_2SO_4$ per minute. This flow rate and the acid mixture were based on the previously conducted static experiments initial the flow experiments using a smaller core holder. Flow experiment 10 is considered to be the base case. The other experiments are variations on this base case.

The base case will be worked out with the recordings of the pressure data and an image of the result of the experiment. The parameters and results of the flow experiments are shown in table 3.

Figure 8:
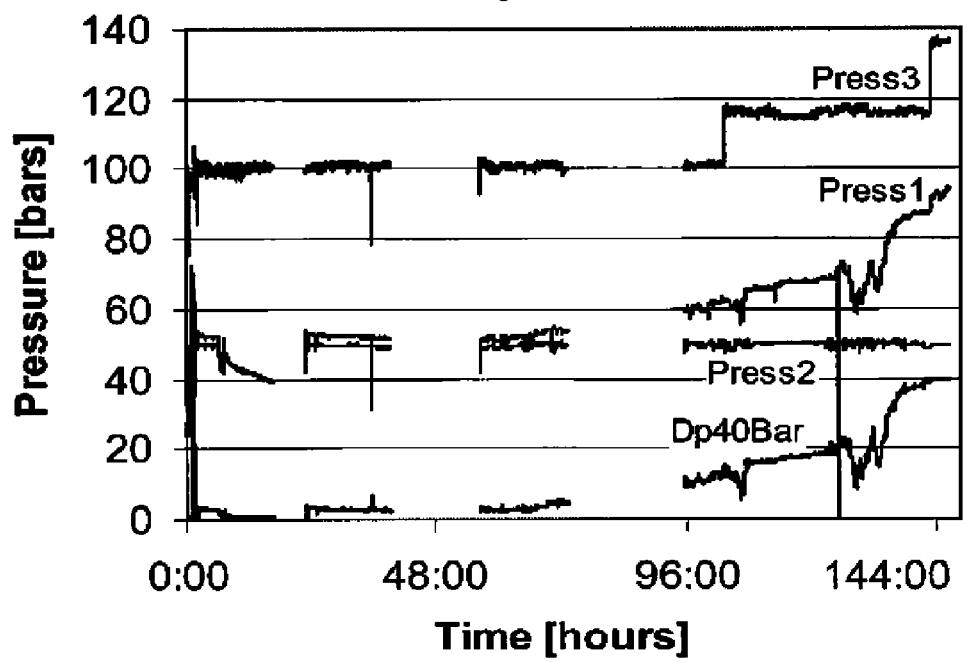
FIG. 8 shows pressure data from flow experiment 10 conducted using the setup shown in FIG. 7. "Press1" is recorded at pressure transducer 1, "Press2" is recorded at pressure transducer 2, and "Press3" is the annular/coreholder pressure recorded at pressure transducer 3. "Dp40Bar" is the differential pressure ($\Delta P$) between the injection side and production side (Dp40 Bar=Press1−Press2). Due to temporary malfunctioning of the data acquisition some time gaps are present in the recorded data.

FIG. 8 shows the pressure data recorded during flow experiment 10. Due to temporarily malfunctioning data acquisition some time gaps are present in the recorded data. "Press 1" is the injection pressure in bars of pressure transducer "1", "Press 2" is the pressure in bars of pressure transducer "2", at the end of the core. "Dp40Bar" is the differential pressure, which is measured directly between pressure transducer 1 and 2. "Press 3" is the annular pressure maintained on the sleeve around the core. "Dp40Bar" is the differential pressure ($\Delta P$) between the injection side and production side (Dp40 Bar=Press1−Press2). Due to temporary malfunctioning of the data acquisition some time gaps are present in the recorded data. The pressure spikes at the start of the experiment are due to closing and opening of valves. The experiment was terminated when a pressure build-up at the injection point occurred. The annular pressure Press 3 was increased twice to maintain a safe pressure difference with the pore pressure. The pressure decreases of pressure 1 and the pressure difference are attributed to breakthrough due to wormholing.

Figure 9:
FIG. 9 shows a photograph of the core after injection of the acid mixture in flow experiment 10. Various wormholes are present and shown in black.
Figure 10:
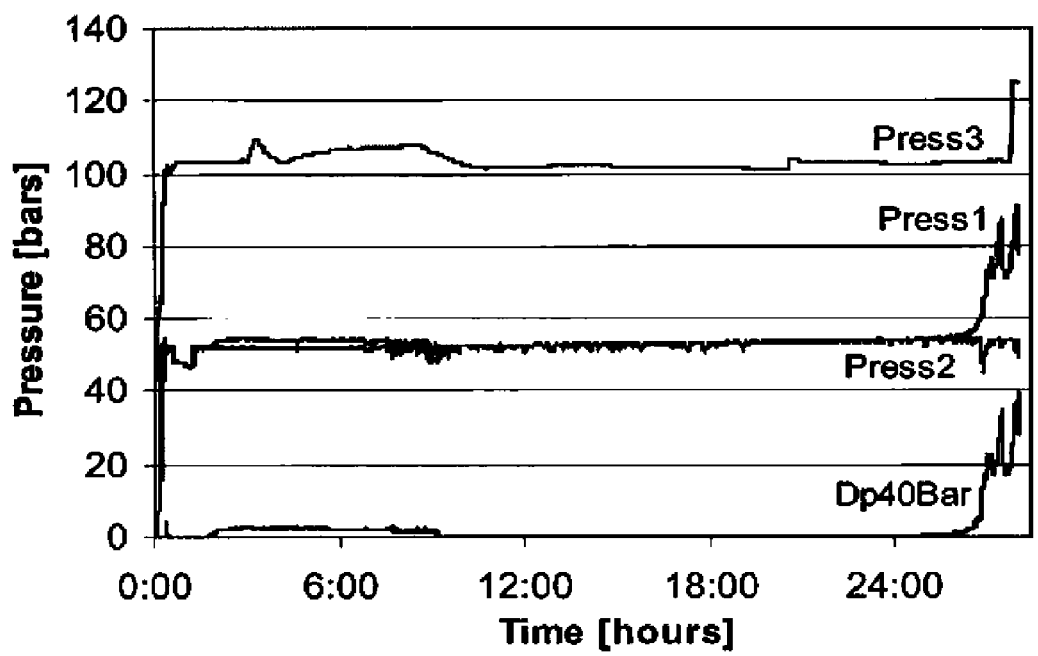
FIG. 10 shows pressure data from flow experiment 19 conducted using the setup shown in FIG. 7.
Figure 11:
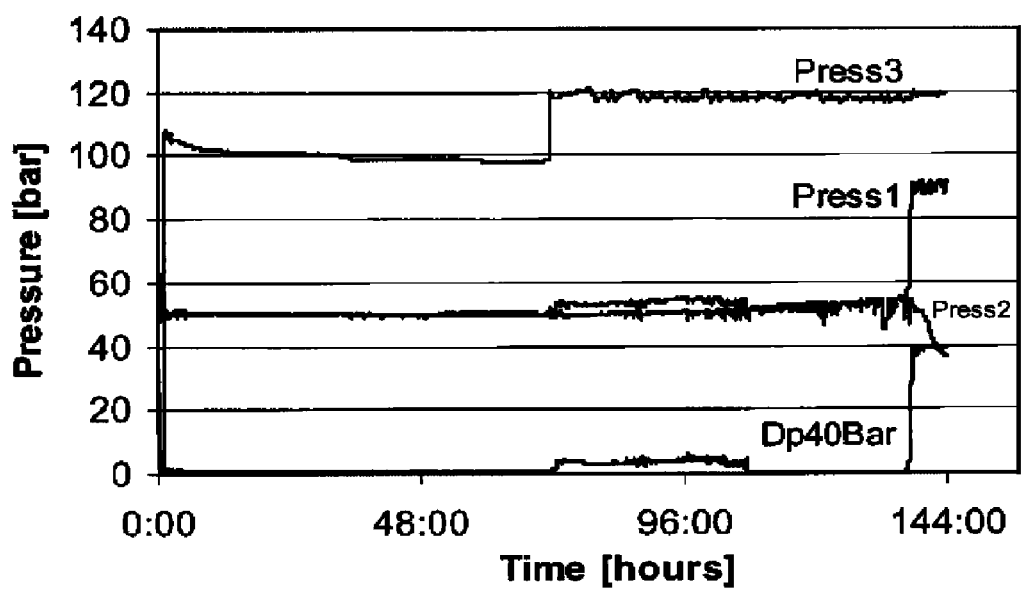
FIG. 11 shows pressure data from flow experiment 20 conducted using the setup shown in FIG. 7.

FIG. 9 shows the core of flow experiment 10 after removal from the coreholder. In this core the white parts are mainly consisting of the original chalk and the grey parts are anhydrite. Wormholes are present and shown in black. Visual inspection of the core showed various wormholes and a clogging of the original drilled hole. The produced fluid contained yellow/brown fines.

TABLE 3

The parameters and results of the flow experiments in the coreholder

| Flow Experiment | 9 | 10 | 11 | 12 | 13 | 14 | 15 | 16 | 17 |
|---|---|---|---|---|---|---|---|---|---|
| Weight (g) | 489.6 | ND | ND | 540.5 | 400 | 490 | ND | 474 | 510.8 |
| Length (mm) | 157 | 172 | 170 | 172 | 170 | 180 | 180 | 170 | 180 |
| Diameter (mm) | 49.4 | 48 | 48 | 48 | 49 | 48 | 48 | 48 | 48 |
| HCl (M) | 0.3 | 0.3 | 0.3 | 0.3 | 0.3 | 0.3 | 0.3 | 0.3 | 0.3 |
| $H_2SO_4$ (M) | 0.9 | 0.9 | 0.9 | 0.9 | 0.9 | 0.9 | 0.9 | 0.6 | 0.6 |
| $H^+/SO_4^{2-}$ ratio | 2.33 | 2.33 | 2.33 | 2.33 | 2.33 | 2.33 | 2.33 | 2.5 | 2.5 |
| Acid injected (ml) | ND | 1900 | 1120 | 1300 | 300 | 700 | 1380 | 200 | 970 |
| $SO_4^{2-}$ injected (mol) | ND | 1.74 | 1.01 | 1.17 | 0.27 | 0.63 | 1.24 | 0.12 | 0.58 |
| Flow rate (ml/min) | 0.250 | 0.250 | 1.000 | 0.500 | 0.125 | 0.250 | 0.250 | 0.250 | 0.250 |
| Drilled hole fracture (mm) | —[8] | 3 | 3 | 3 | 3 | 3 | 3 | 3 | 3 |
| Fracture closed? | Yes | Yes | Yes[1] | Yes[1] | Yes[2] | Yes | Yes | Yes | Yes |
| Wormholes? | ND | Yes | Yes | Yes | No | Yes | Yes | Yes | Yes |

TABLE 3-continued

The parameters and results of the flow experiments in the coreholder

| Flow Experiment | 18 | 19[3] | 20 | 21 | 22[5] | 23[6] | 24 | 25[7] |
|---|---|---|---|---|---|---|---|---|
| Weight (g) | 490 | ND | 443.1 | 413.8 | 453 | 321.6 | 330.4 | 400 |
| Length (mm) | 162 | 180 | 165 | 154 | 150 | 180 | 134 | 152.5 |
| Diameter (mm) | 48 | 48 | 48 | 48 | 48 | 48 | 48 | 49 |
| HCl (M) | 0.3 | 0.3 | 0.3 | 1.0 | 0 | 1.0 | 0.3 | 0.3 |
| $H_2SO_4$ (M) | 1.5 | 0.9 | 0.9 | 3.0 | 0 | 3.0 | 0.9 | 0.9 |
| $H^+/SO_4^{2-}$ ratio | 2.2 | 2.33 | 2.33 | 2.33 | 0 | 2.33 | 2.33 | 2.33 |
| Acid injected (ml) | 1180 | 850 | 1390 | 2000 | 0 | 170 | 700 | 530 |
| $SO_4^{2-}$ injected (mol) | 1.77 | 0.77 | 1.25 | 0.6 | 0 | 0.49 | 0.63 | 0.48 |
| Flow rate (ml/min) | 0.250 | 0.500 | 0.250 | 0.250 | 0.250 | 0.250 | 0.250 | 0.250 |
| Drilled hole fracture (mm) | 3 | 3 | 5 | 3 | 3 | —[6] | 8 | 3 |
| Fracture closed? | Yes | Yes[4] | Yes | Yes[2] | Yes | Yes[2] | Yes | Yes |
| Wormholes? | Yes | Yes | Yes | No | No | NR | No | No |

ND, not determined; NR, not relevant;
[1]After the core;
[2]At injection point;
[3]Repetition of Flow experiment 12;
[4]Setup clogged;
[5]Effect of injecting brine alone;
[6]Loose chalk packed together;
[7]Increased backpressure. and injection pressure;
[8]Horizontal fracture

Example 4

Flow Experiments—Flow Rate

The preliminary experiments (not shown) have shown that:
Flow rate has a large effect on the dissolution and precipitation process, when the acid mixture is injected into the chalk.
High fluid velocities can lead to low or no precipitation in the artificially created fracture. Low fluid velocities may lead to surface reactions and sealing off the matrix.

One also has to realize that flow rate is important since the mass flow of ions into the core changes, when the flow rate varies.

Four experiments were performed to study the influence of the flow rate. Flow experiment 11 was performed with a flow rate of 1.000 ml/min of a 0.3/0.9 M $HCl/H_2SO_4$ acid mixture. Flow experiment 12 and 19 with a flow rate of 0.500 ml/min and flow experiment 13 with a flow rate of 0.125 ml/min. Experiment 19 was a repetition of flow experiment 12. The reason for the repetition was clogging of the set-up during the experiment. The injection pressure at flow experiment 12 surpassed the pressure ranges of the pressure transducers, resulting in plastic behaviour and a boudinaged type of core after the experiment.

The experiments with the flow rates of 0.500 and 1.000 ml/min typically resulted in clogging of the setup after the core in the tubing of the setup. The experiment with the flow rate of 0.125 ml/min showed that there was clogging near the injection part of the core.

Example 5

Flow Experiments—Time of Injection

In flow experiment 14 and 15 the factor time has been investigated. These two experiments are similar to the base case; however, a shorter injection time of two and four days, respectively, with a flow rate of 0.250 ml/min was applied.

The core with an injection time of four days showed more wormholes and visible anhydrite than the core with an injection time of two days. In addition, the wormholes went further into the core with increase of injection time. After removing the sleeve, both cores were hard compared to the soft nature of the original chalk. The produced fluid for both experiments contained yellow/brown fines.

Example 6

Flow Experiments—Change in $H^+/SO_4^{2-}$ Ratio

The $H^+/SO_4^{2-}$ ratio is one factor controlling the dissolution and precipitation process in chalk. To verify this observation for dynamic experiments, two different acid ratios were tested with a flow rate of 0.250 ml/min. In flow experiment 16 and 17 an acid mixture of 0.3/0.6 M $HCl/H_2SO_4$ was injected. Because of failure of the tubing during flow experiment 16, the experiment was repeated. In flow experiment 18 a 0.3/1.5 M $HCl/H_2SO_4$ was injected.

For the 0.3/0.6 M $HCl/H_2SO_4$ acid mixture the result was a core with multiple wormholes and cementation of the drilled hole. For the 0.3/1.5 M $HCl/H_2SO_4$ acid mixture, the experiment created a single wormhole and a matrix at the injection side, which was mostly altered to anhydrite. The drilled hole was clogged as well.

Drilling large single cores out of the sample blocks was difficult due to the brittle nature of the chalk. Therefore, it was decided to put three smaller cores into the coreholder for flow experiment 17. It was observed that one of the core boundaries acted as a barrier of flow for fluid transport. Acid reaction with the chalk matrix ended here, but a single wormhole went through the barrier.

Example 7

Flow Experiments—Type of Opening

All the flow experiments have an opening in the core to simulate a highly permeable zone in the chalk. As a standard a 3 mm drilled hole in the chalk has been used. To check whether other forms and sizes of openings will clog as well, three different tests were performed:

Flow experiment 9 had a sawn fracture plane parallel to the axial direction;

Flow experiment 20 had a 5 mm drilled hole; and,

Flow experiment 24 had an 8 mm drilled hole.

The flow rates in these experiments were 0.250 ml/min and the acid composition was $0.3/0.9$ M $HCl/H_2SO_4$. The experiment with the fracture plane showed that the two opposing sides of the core have cemented completely. The time of injection in this experiment was limited because of injection problems due to pump failure. The experiments with the larger diameter holes resulted into clogging and cementation, although it took considerable time to reach pressure difference.

Example 8

Flow Experiments—Loose Chalk

In this experiment chalk chunks of 5 to 25 mm of size were put into the sleeve until a bulk size of 48×180 mm was achieved. For injection a fluid consisting of $1.0/3.0$ M $HCl/H_2SO_4$, with a flow rate of 0.250 ml/min, was used.

At the injection point, there was a complete transformation to anhydrite. At the production point there was a build-up of fines against the filter. The chalk chunks in the core are compressed by the overburden pressure.

Example 9

Flow Experiments—Elevated Concentration

A higher concentration of the injection fluid results into a higher mass flow of ions per time unit. One experiment was performed to see what the influence is of a higher concentration. The used acid concentration in flow experiment 21 was $1.0/3.0$ M $HCl/H_2SO_4$. The flow rate was 0.250 ml/min.

As a result, the drilled hole at the injection point was closed with anhydrite. However, the majority of the core was unaffected by the injection fluid. The acid concentration resulted in pump problems.

Example 10

Flow Experiments—Brine Test

The core is saturated and flushed with brine before every flow experiment in the large coreholder is performed. To check whether this procedure has influence on the experiments, one flow experiment was performed where a core was flushed with brine for two days, and then opened and examined for the results.

Visual inspection of the core showed that the drilled hole in the core was closed with fines. The core was pasty at the injection point. The pressure build-up after two days of injection was marginal.

Example 11

Flow Experiments—Increased Back Pressure

In flow experiment 25 the influence of an increased back pressure was investigated. This was done to check whether the pressure affects the dissolution and precipitation process at all. An increase in the back pressure to around 100 bar (compared to the standard 50 bar) gives a higher injection pressure (around 100 bar), and also needs a higher annular pressure (around 150-160 bar).

Compared to the base case, the cores clog faster. Visual inspection of the cores shows no visible wormholes.

Example 12

Flow Experiments—Sealing of a Horizontal Fracture

Figure 12:
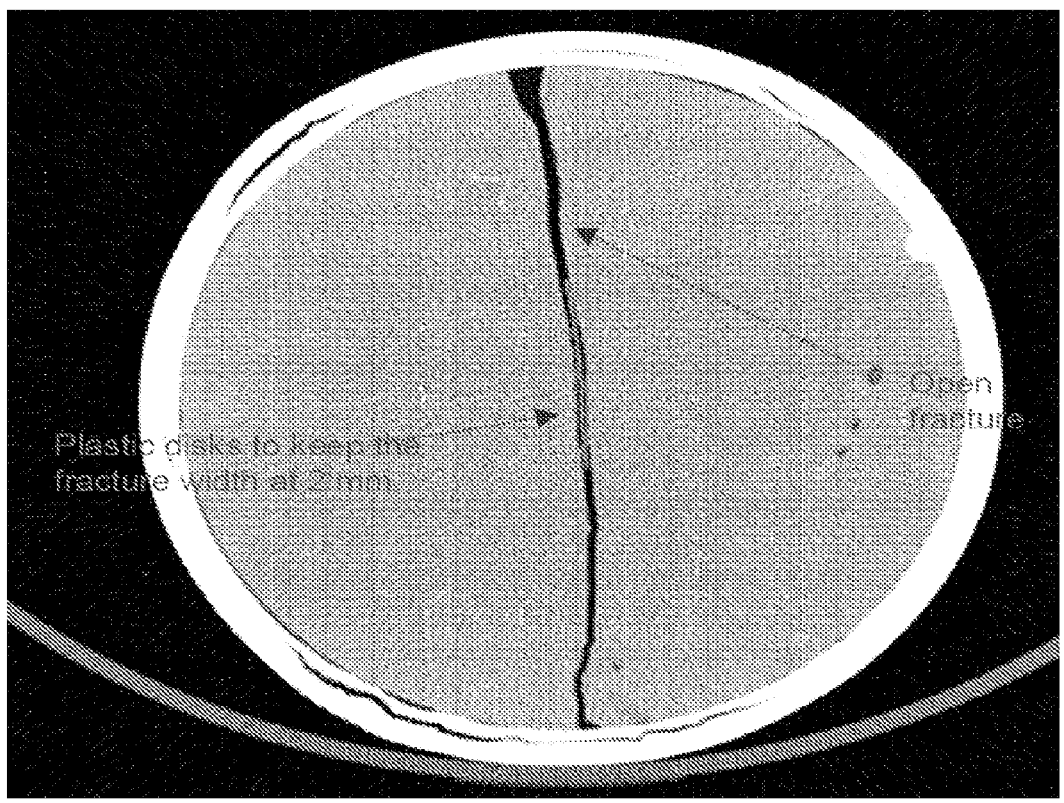
FIG. 12 shows CT scan slice no. 96 of an induced horizontal fracture parallel to the flow direction. A small plastic disc is visible, keeping the two parts of the fractured core at least 2 mm apart.
Figure 13:
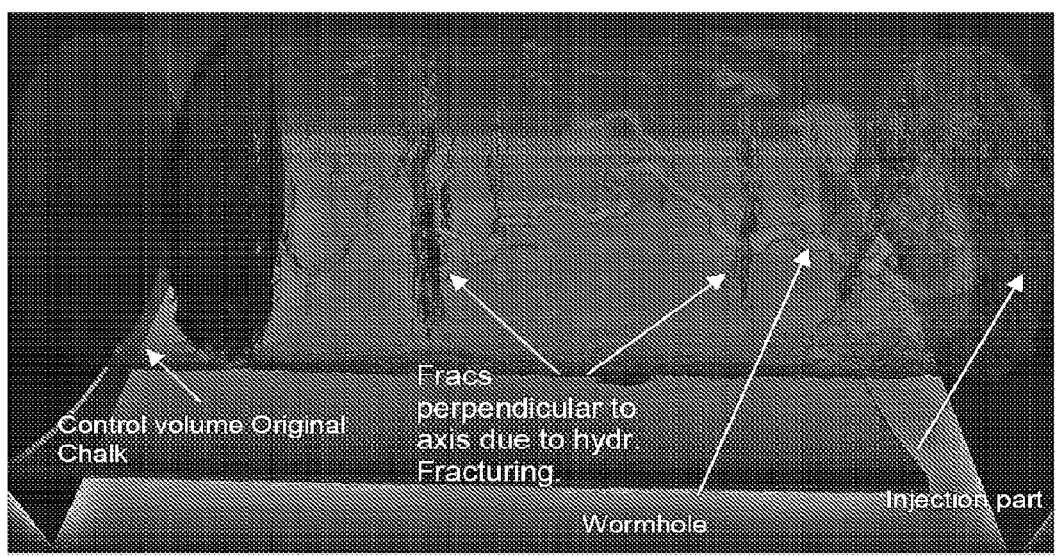
FIG. 13 shows a 3D rendering of CT-scans visualizing the core in FIG. 12 after injection of the sealing fluid completely sealed the horizontal fracture. A wormhole spanning the entire core from injection side to production side have been created. At the end of the experiment a large over-pressure fractured the core in two places perpendicular to the original fracture.

In flow experiment 37 a fracture parallel with the flow direction was made. Plastic discs were introduced in order to generate and maintain a 2 mm fracture width. A perpendicular cross section of the core is shown in FIG. 12 showing CT scan slice no. 96 of an induced horizontal fracture parallel to the flow direction. A small plastic disc is visible, keeping the two parts of the fractured core at least 2 mm apart. The chalk core weighed 2229 g, was 19.1 cm long and had a diameter of 9.8 cm. The pore volume (PV) was 610 ml (porosity: 0.42). Initially the sample was saturated with brine followed by acid injection. During the course of the experiment 14 PV of an acid mixture (0.3 M HCl and 0.9 M $H_2SO_4$) was injected at a flow rate of 2 ml/min. By analysing the effluent using HPLC it was observed that the effluent concentration of $SO_4^{2-}$ was lower than the injection concentration, which is to be expected, since anhydrite formation is taking place.

Visual analysis of the core after the experiment showed that the fracture was closed by anhydrite formation (see FIG. 13) i.e. anhydrite completely sealed the horizontal fracture. A wormhole or a system of wormholes spanning the entire core from injection side to production side have been created and parts of the wormholes have been sealed by anhydrite formation again. These wormholes start at the injection side, and branch out towards the production side. Hydraulic fractures perpendicular to the flow direction are observed. These hydraulic fractures were created due to high pore pressure in the last phase of the experiment.

Example 13

Flow Experiments—FE43, FE49, FE50

In the flow experiments FE43, FE49 and FE50 a fracture parallel with the flow direction was made similar to example 12. The results are shown in table 4 below.

TABLE 4

The parameters and results of additional flow experiments in the core holder

| Flow Experiment | 43 | 49 | 50 |
|---|---|---|---|
| Weight (g) | 3233 | 3331.4 | 3031 |
| Length (mm) | 282 | 289 | 268 |
| Diameter (mm) | 99 | 99.9 | 99 |
| HCl (M) | 0.3 | 0.3 | 0.3 |
| $H_2SO_4$ (M) | 0.9 | 0.9 | 0.9 |
| $H^+/SO_4^{2-}$ ratio | 2.33 | 2.33 | 2.33 |
| Acid injected (ml) | 3087 | 5800 | 6310 |
| $SO_4^{2-}$ injected (mol) | 2.89 | 5.4 | 5.7 |

TABLE 4-continued

The parameters and results of additional flow experiments in the core holder

| Flow Experiment | 43 | 49 | 50 |
|---|---|---|---|
| Flow rate (ml/min) | 2 | 2 | 2 |
| Horizontal fracture (mm) | 2 | 2 | 3 |
| Fracture closed? | Yes | Yes | Yes |
| Wormholes? | Yes | Yes | Yes |

Figure 16:
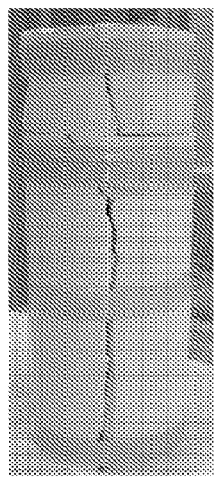
FIG. 16 shows a picture of the fractured core used in FE43 before injecting the acidic solution containing sulphate (a), and after (b) the acidic solution has sealed the fracture.
Figure 16:
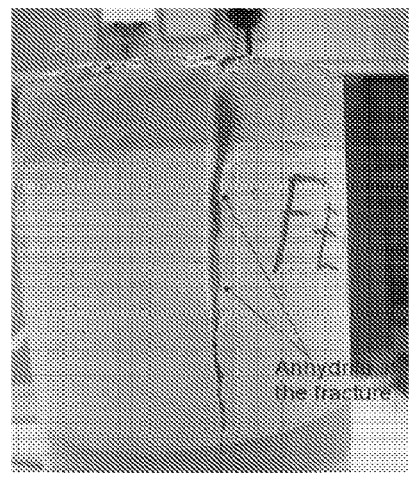

FIG. 16 shows the core sample from FE43 before and after closing the horizontal fracture with anhydrite. Analysis show that the while the injected acid contains around 90 g/l of sulfuric acid, less than 2 g/l of sulfuric acid/sulfate is recovered on the production side illustrating that most of the sulfate ions have precipitated inside the core.

Example 14

Tensile Strength of Sealed Fracture—Brazilian Test

Normally the tensile strength is found using a direct uniaxial test, which is difficult to perform with the samples. The splitting tensile or Brazilian Test offers a good alternative. A circular disk of rock with a thickness to diameter ratio (t/d) between 0.2 and 0.75 is placed on its radial side between a compression machine and is loaded. As seen in FIG. 14 a load in the vertical direction (FIG. 14*a*, shown by arrows) induces a parallel fracture. The tensile strength (FIG. 14*b*) is perpendicular to the load (see arrows).

In this situation the following equation for the Brazilian tensile strength can be applied:

$$\sigma_t = \frac{2F}{\pi LD} \quad (3.1)$$

In which,
$\sigma_t$=the splitting tensile strength [MPa],
F=maximum applied load indicated by the testing machine [N],
L=thickness of the specimen [mm],
D=Diameter of the specimen [mm]

Seven cores were drilled from a block of untreated chalk and six from the fractured, and subsequently treated cores of experiment FE49 and FE50. It has been made sure that the original sealed fractures are in the treated cores. The cores all have a diameter of approximately 50 mm. It was calculated with the acid injection calculations and the image analysis calculations that FE49 has an anhydrite content of approximately 22% and FE50 an approximate anhydrite content of 24%. These cores are sawed in blocks of approximately 20 mm in length. Of both experiments only 3 of these cores could be obtained. During these experiments the core length, diameter and maximum loading pressure were measured, in order to calculate the tensile strength in accordance with equation 3.1, see FIG. 15.

Figure 15:
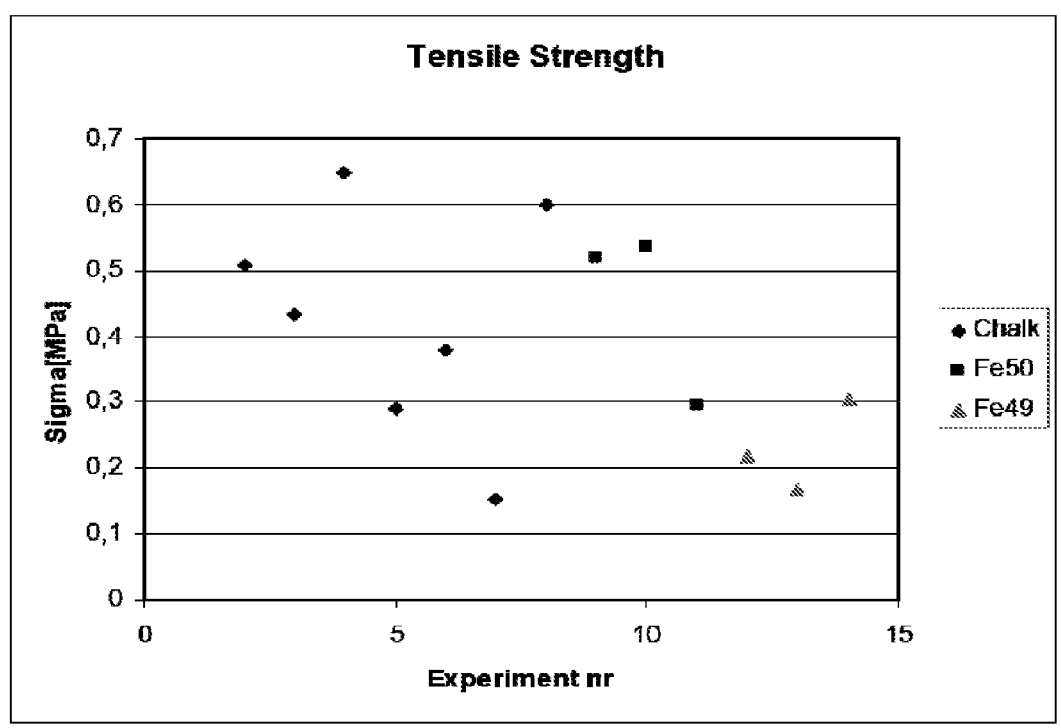
FIG. 15 shows the results of the Brazilian test setup, where it can be seen that the tensile strength of the fractured and resealed cores (as measured using the Brazilian test method of example 15) is not measurably different from the tensile strength of chalk that has not been fractured and resealed.

In FIG. 15 it can be seen that the tensile strength of the chalk differs between 0.15 MPa and 0.65 MPa. All samples of the acidized cores vary in the same range. Consequently, the tensile strength is not different compared to of the original chalk. In other words, the tensile strength of the fractured and sealed chalk samples are not deteriorated according to the measurements of example 13.

Two acidized samples were placed with their sealed fracture in the vertical pressure direction. And the others were placed with their sealed fracture under small angles of the vertical pressure difference. This was done to see if the old fracture is a preferential path for the new fracture. It was observed that the old sealed fractures are not preferential new fracture paths.

Example 15

Hydraulic Fracture Experiments Under Confining Stress

Figure 17:
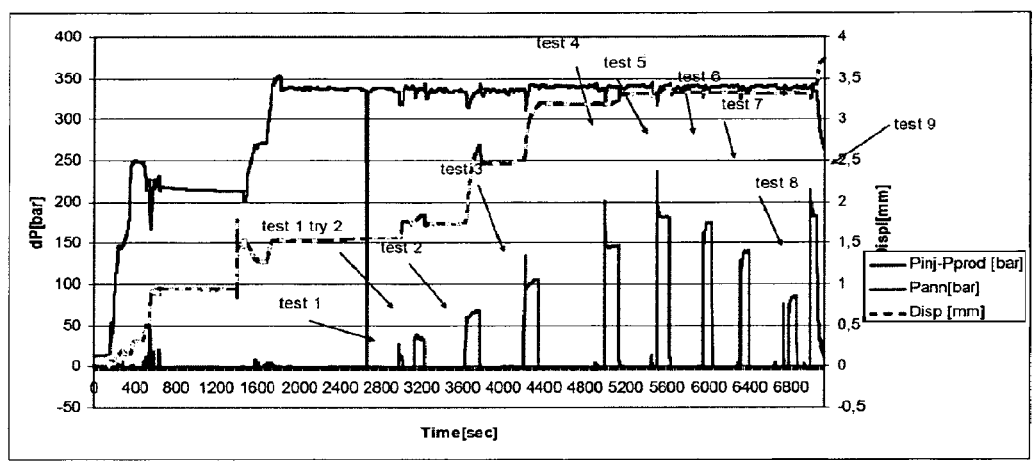
FIG. 17 shows a fracture test on resealed FE43. Pressure difference between the injection and production side (Pinj-Pprod) are shown as the bottom trace marked (test 1; test 1 try 2; test 2; test 3; test 4; test 5; test 6; test 7; test 8; test 9), and the upper trace shows the annular pressure being around 320 bar (Pann), and the middle trace shows the final compression of the core to be around 3.5 mm (Disp). The experiment takes place over the course of 2 hours (7200 seconds).

This experiment was done on sealed fracture in the resulting core of FE43. The fracture tests were performed under reservoir conditions, where the annular/confining pressure is 320 bar, the pore/injection pressure 270 bar and temperature 80° C. The pore pressure was created with fresh water. The experimental setup is very similar to the flow experiments. However, here the pressure differences are much higher. The core is put inside a rubber sleeve in the reactor, the annulus pressure is brought up to 30 bars while flooding the core with water. The injection pressure and production pressure is brought to 270 bar while the annulus pressure is brought up to 320 bar. At time is zero the back pressure valve on the production side is released to 200 bar unto 0 bar in steps of 60 bar, while pumping water hard in the core on the production side to keep the inlet pressure at 270 bar. In this way high pressure differences are created over the sample. Every single fracture test with a pressure difference could only be performed for several minutes due to the fact that the pressure pump used for injecting the water has a reservoir of 50 ml. During the FE43 experiment this is procedure is followed 9 times as can be seen in FIG. 17.

FE43 showed the pressure build-up (FIG. 17), a minor axial compaction (about 3.5 mm or ca. 1.3 vol. %). FIG. 17 shows the confining pressure, pressure difference steps and the compaction. The annulus pressure or confining pressure is maintained at 320 bar during the test. After the experiment the core was cut in order to recognize new fractures. No fractures were found in the sample demonstrating that the old sealed fracture is not susceptible to fracturing under the above-simulated reservoir conditions.

The invention claimed is:

1. A method for selectively sealing a thief zone in a hydrocarbon reservoir located in a calcium-rich formation and penetrated by a borehole comprising injecting into the thief zone a sealing fluid comprising a mixture of hydronium ions ($H^+$) and a source of sulfate ions ($SO_4^{2-}$) which mixture can provide precipitation of a calcium sulfate compound thereby providing a seal, wherein the $[H^+]/[SO_4^{2-}]$ ratio is higher than 2.

2. The method according to claim 1, wherein more than 50% of the formed calcium sulfate compound is anhydrite.

3. The method according to claim 2, wherein the seal withstands at least 40 bar differential pressure.

4. The method according to claim 2, wherein $[H^+]/[SO_4^{2-}]$ is lower than 2.5.

5. The method according to claim 2, wherein the injection pressure is larger than 200 bar.

6. The method according claim 2, wherein the ionic strength of the sealing fluid is increased by the addition of water-soluble salts.

7. The method according to claim 6, wherein the ionic strength of the sealing fluid is larger than 20 M.

8. The method according to claim 2, wherein the source of hydronium ions is HCl or a mixture of HCl and $H_2SO_4$.

9. The method according to claim 2, wherein the source of hydronium ions ($H^+$) is hydrochloric acid (HCl).

10. The method according claim 2, wherein the source of hydronium ions ($H^+$) is hydrochloric acid (HCl) and the source of sulfate ions ($SO_4^{2-}$) is disodium sulfate ($Na_2SO_4$).

11. The method according to claim 1, wherein the seal withstands at least 40 bar differential pressure.

12. The method according to claim 11, wherein $[H^+]/[SO_4^{2-}]$ is lower than 2.5.

13. The method according to claim 11, wherein the injection pressure is larger than 200 bar.

14. The method according to claim 1, wherein $[H^+]/[SO_4^{2-}]$ is lower than 2.5.

15. The method according to claim 1, wherein the injection pressure is larger than 200 bar.

16. The method according to claim 1, wherein the ionic strength of the sealing fluid is increased by the addition of water-soluble salts.

17. The method according to claim 16, wherein the ionic strength of the sealing fluid is larger than 20 M.

18. The method according to claim 1, wherein the source of hydronium ions is HCl or a mixture of HCl and $H_2SO_4$.

19. The method according to claim 1, wherein the source of hydronium ions ($H^+$) is hydrochloric acid (HCl).

20. The method according claim 1, wherein the source of hydronium ions ($H^+$) is hydrochloric acid (HCl) and the source of sulfate ions ($SO_4^{2-}$) is disodium sulfate ($Na_2SO_4$).

* * * * *